United States Patent [19]

Dolfi et al.

[11] Patent Number: 5,138,480
[45] Date of Patent: Aug. 11, 1992

[54] TRAVELING WAVE OPTICAL MODULATOR

[75] Inventors: David W. Dolfi, Los Altos; Roger L. Jungerman, Petaluma, both of Calif.

[73] Assignee: Hewlett-Packard Company, Palo Alto, Calif.

[21] Appl. No.: 745,022

[22] Filed: Aug. 14, 1991

[51] Int. Cl.$^5$ .............................................. G02B 6/10
[52] U.S. Cl. ........................................ 359/251; 385/2; 385/3
[58] Field of Search ................... 359/251, 254; 385/2, 385/3, 8, 9

[56] References Cited

U.S. PATENT DOCUMENTS

| | | | |
|---|---|---|---|
| 4,266,850 | 5/1981 | Burns . | |
| 5,004,313 | 7/1991 | Ty Tan et al. | 385/2 |
| 5,042,895 | 8/1991 | Chouinard et al. | 385/2 |
| 5,061,030 | 10/1991 | Miyamoto et al. | 385/3 |
| 5,088,097 | 2/1992 | Ono et al. | 385/2 |

OTHER PUBLICATIONS

M. Seino et al., "33-CHz.cm Braodband Ti:LiNbO₃ Mach-Zehnder Modulator," ECOC '89, Gothenburg, Sweden, pp. 433-436 (1989).
K. Kawano et al., "High-Speed and Low Driving Power Ti:LiNbO₃ Mach-Zehnder Optical Modulator at 1.5 μm Wavelength," LEOS '88, Santa Clara, California, p. 96 (1988).
R. Jungerman et al., "Development of an Optical Modulator for a High-Speed Lightwave Component Analyzer", Hewlett-Packard Journal, Feb. 1991, pp. 41-45.
K. Kawano et al., "New Traveling-Wave Electrode Mach-Zehnder Optical Modulator with 20 GHz Bandwidth and 4-7V Driving Voltage at 1-52um", Electronics Letters, 28 Sep. 1989, vol. 25, No. 20, pp. 1382-1383.

Primary Examiner—Janice A. Howell
Assistant Examiner—Kiet T. Nguyen

[57] ABSTRACT

A traveling wave optical modulator on X-cut lithium niobate is disclosed which has improved bandwidth capability along with a low switching voltage requirement and good impedance matching. In accordance with another aspect of the disclosed invention, the impedance of a traveling wave optical modulator may be increased to a desired input impedance without adversely affecting the drive voltage or velocity matching of the modulator. This is accomplished by reducing the width of the ground electrodes to not more than 3 times the width of the hot electrode.

20 Claims, 3 Drawing Sheets

TRAVELING WAVE OPTICAL MODULATOR

BACKGROUND OF THE INVENTION

This invention relates to traveling wave optical modulators and more specifically to a design for such a modulator which provides a substantial improvement in performance. A discussion of conventional optical modulators can be found in "Integrated Optical Circuits and Components, Design and Applications," edited by Lynn D. Hutcheson, published by Marcel Dekker, Inc., 1987. See Chapter 6 entitled "Ti:LiNbO3 Integrated Optic Technology."

Optical modulators capable of modulating the intensity of light efficiently at high frequencies are valuable in the area of fiber optic telecommunications. Because of the very large bandwidth achievable by optical transmission, and because much of existing communications technology uses electrical rather than optical means to implement functions such as encoding information on an optical carrier, it is desirable to mate the electrical and optical technologies. A device such as a traveling wave optical modulator which provides an efficient way to intensity-modulate light at high frequency by means of an electrical signal accomplishes this.

Traveling wave optical modulators use an electromagnetic signal such as a microwave signal to intensity-modulate light in an optical waveguide channel. Typically, crystal material such as lithium niobate is used as a substrate within which the optical waveguide channel is formed. The optical waveguide channel is formed by photolithographic masking and diffusion of an element such as titanium into the crystal substrate to produce a region with a higher optical index of refraction than the optical index of refraction of the surrounding substrate. The difference in refractive indices produces total internal reflection to thereby constrain the propagation of light within the optical waveguide channel.

The optical index of refraction of a material relates to the phase velocity of light in the material. The crystal substrate has the property that its optical index of refraction is affected by an electromagnetic signal. The electromagnetic signal is applied by means of electrodes. By placing the electromagnetic signal in close proximity to the optical waveguide channel such that the optical index of refraction of the waveguide in the substrate is affected, the light propagating along the waveguide may be modulated in response to the electromagnetic signal.

In an optical modulator where the optical waveguide channel is diffused into the substrate through one surface, the waveguide will be at that one surface of the substrate, and the electrodes for applying the electromagnetic signal are mounted on that one surface of the modulator. Usually the electrodes are elongated and are positioned parallel to the optical waveguide channel, with the waveguide being located either directly under or between the electrodes.

The optical waveguide channel is positioned to take advantage of the electric field's maximum effect on changing the optical index of refraction within the waveguide. Where an optical waveguide channel is diffused into a crystal substrate that exhibits more than one index of refraction in differing directions, it is preferable to utilize the index of refraction in the direction which is most susceptible to change by an electric field.

The primary design goals in fabricating traveling wave optical modulators are (1) broad modulation bandwidth, (2) low switching voltage and (3) impedance matching to the electromagnetic signal modulation source.

Broad modulation bandwidth is required to take advantage of the high-frequency capability of optical transmission. Typically, desired bandwidths have been on the order of tens of gigahertz. The bandwidth is limited primarily by the mismatch in velocity of the optical signal and the microwave signal used to modulate the optical signal. Since the microwave signal travels more slowly through the electrodes than the optical signal travels through the optical waveguide, a phase error is introduced. The extent of the phase error depends upon (1) the frequency of the microwave signal and (2) the length of interaction of the electric field generated by the microwave signal with the optical path.

The phase error decreases with a decrease in frequency of the microwave signal. However, the goal is generally to design a modulator which operates to as high a frequency as possible, so decreasing the frequency is not a design option. Making the length of interaction between the signals smaller would allow a higher bandwidth, but this also increases the switching voltage (discussed below).

It is therefore an object of the present invention to increase the bandwidth of the traveling wave optical modulator by improving velocity matching while maintaining a low switching voltage.

The switching voltage is defined to be a dc voltage which, when applied across the electrodes, turns the optical modulator from full off to full on. A low switching voltage is desired to optimize the amount of modulation for a given power level of the microwave modulating signal. A lower microwave power requirement allows for the design of less costly drive circuitry.

The primary parameters affecting the switching voltage are the electrode gap and electrode length. The smaller the distance or gap between the electrodes, the smaller will be the necessary switching voltage. But the electrodes cannot be placed too close together since the depth of electric field penetration into the substrate decreases as the gap size decreases. This means there will be less electric field overlap with the optical waveguide channel when the gap size is small. Also, as in some designs where two or more optical waveguide channels must be located directly below adjacent electrodes, the gap size is limited because the waveguides must not be too close together or cross-coupling between the waveguides will occur.

It is therefore another object of the present invention to achieve a low switching voltage while also achieving strong field overlap and preventing cross-coupling.

Finally, the output impedance from the microwave modulation source should ideally equal or "match" the input impedance of the optical modulator. An impedance mismatch causes power loss and reflections which could disrupt the drive circuitry. Typically, a microwave signal modulation source will have an impedance of 50 ohms which exceeds the impedance of the optical modulator. It is thus desirable to employ a design which increases optical modulator impedance.

The impedance of the optical modulator is primarily dependent upon the electrode gap and the "hot" electrode width. As used in this specification, a "hot" electrode is defined as a first electrode of an electrode pair where the second electrode of the pair is the ground electrode. The ground electrode is traditionally the electrode of greater width in the pair and is connected to the shielding means of a cable which provides a microwave signal to the optical modulator. A given electrode pair defines a gap width between the pair. A smaller gap creates a smaller impedance while a larger hot electrode width further reduces the impedance. As explained above, a small gap is desirable to reduce the switching voltage while a relatively large hot electrode width is desired to reduce electrode RF losses. This is a design conflict between impedance matching versus low switching voltage and low RF losses.

It is therefore another object of the present invention to achieve a low switching voltage while also achieving microwave impedance matching and low RF losses.

In summary, the design goals of a traveling wave optical modulator are broad modulation bandwidth, low switching voltage, and low microwave insertion loss which includes impedance matching. However, achieving these design goals has traditionally been complicated by the fact that in the design of an optical modulator, many of the parameters are interdependent upon and conflict with one another.

SUMMARY OF THE INVENTION

It is a principal object of the invention to provide an efficient means of modulating light in an optical waveguide channel by means of an electromagnetic signal. This goal is realized by providing an improved design for a traveling wave optical modulator. The optical modulator in accordance with one embodiment of the present invention provides good velocity matching resulting in a broad bandwidth along with a low switching voltage and good impedance matching.

This invention teaches the use of finite width ground electrodes, which allows the impedance of the optical modulator to be increased without affecting other design parameters so that improved impedance matching between the modulation source and the modulator can be achieved. In a preferred embodiment, the design is implemented on an X-cut lithium niobate substrate using two ground electrodes and one hot electrode. This design results in a greatly improved high-frequency optical modulator.

In accordance with one aspect of the invention, a critical design parameter, i.e., the microwave impedance can be improved without incurring any penalty for any of the other parameters by means of reducing the width of the ground electrodes. Previously the ground electrode width has been made as large as possible on the device in the belief that "infinite" ground electrodes are desirable. Further, trying to achieve impedance matching by varying other dimensions of the design always involved a design tradeoff with another critical design parameter such as switching voltage or bandwidth.

More specifically, the invention provides an optical modulator for modifying an optical signal in response to an electromagnetic signal wherein the modulator comprises a substrate having a process side and at least one optical index of refraction and one or more optical waveguide channels. The waveguides have an optical index of refraction and are surrounded by media whose indices of refraction are less than the index of refraction of the waveguides, such that the waveguides provide transmission of optical energy by total internal reflection.

The optical modulator also comprises a plurality of elongated electrodes connected to the substrate so that the electrodes are adjacent to one another and means for applying a voltage differential across at least a pair of electrodes to produce a traveling wave propagating along the electrode pair, thereby generating an electric field which overlaps with at least one waveguide, causing a change in the optical index of refraction of the overlapped waveguide in response to the applied voltage differential. The change in the optical index of refraction intensity-modulates an optical signal in the overlapped waveguide as a function of the electric field. The electrode width for a given electrode in an electrode pair is defined as the average dimension of the electrode along a direction perpendicular to the direction of propagation of the traveling wave within the electrode and parallel to the process side of the substrate. One electrode of the pair is wider than the other, and the ratio of the width of the wider electrode to that of the narrower electrode in a given electrode pair does not exceed about 3.

Another aspect of the invention provides an optical modulator in which an X-cut lithium niobate substrate is used and electrode thickness and buffer layer thickness are selected based on the physical properties of the X-cut lithium niobate substrate and in cooperation with other physical design considerations such as the gap width, optical channel spacing and hot electrode width to produce a modulator achieving superior performance.

DESCRIPTION OF THE PREFERRED EMBODIMENT

Figure 1:
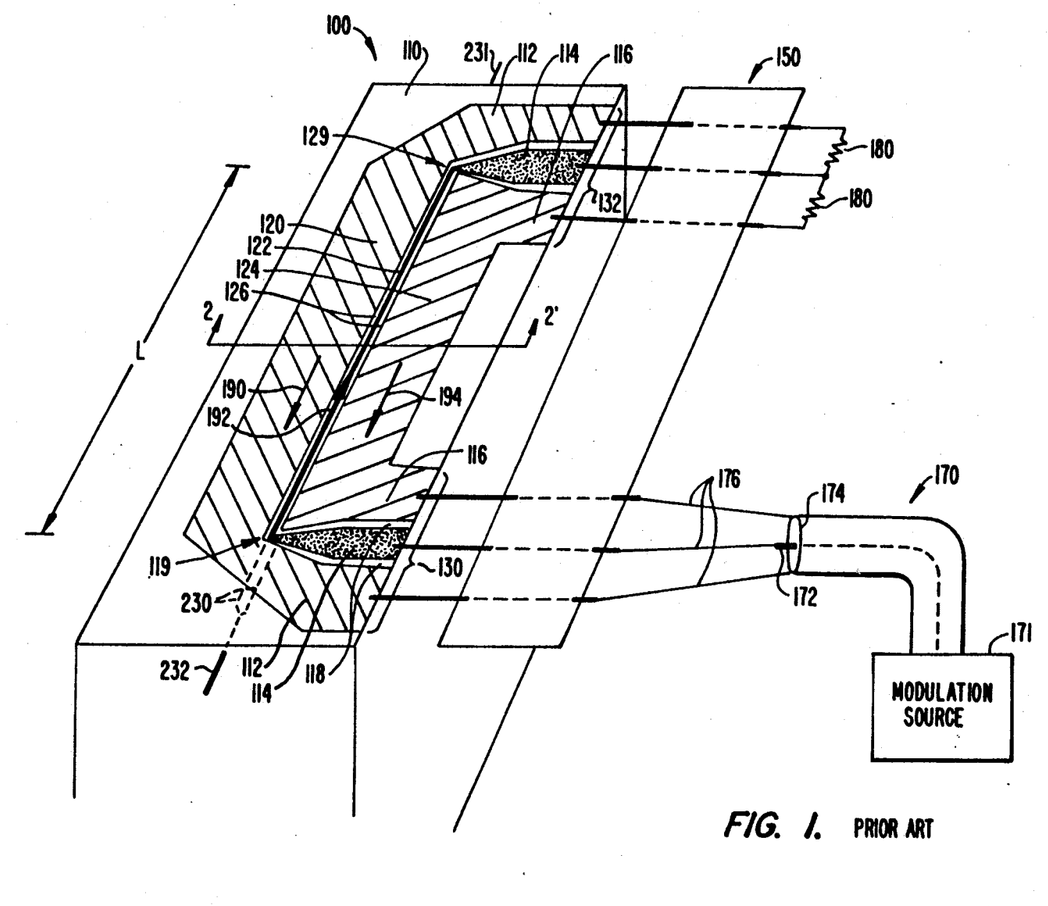
FIG. 1 is a perspective view of a prior art traveling wave optical modulator showing its connections to an impedance matching circuit and microwave signal modulation source.

FIG. 1 is a perspective view of a prior art traveling wave optical modulator 100 in a Mach-Zehnder interferometer intensity modulator configuration. The optical modulator 100 is shown in conjunction with an impedance matching circuit 150 and a coaxial cable 170. The coaxial cable 170 is connected to a source of microwave signals 171. Note that FIG. 1 is not to scale and that some aspects of FIG. 1 have been simplified for ease of discussion. Most noticeably, the impedance matching circuit 150 is shown schematically and coaxial cable connections 176 are shown merely as lines instead of a true perspective view of the connections.

Optical modulator 100 comprises a substrate 110 which is a crystal, typically lithium niobate (LiNbO$_3$), where such a crystal has at least one index of refraction that varies in response to an electric field applied to the crystal. Fabrication of an optical modulator upon the substrate 110 typically takes place on one side of the substrate called the "process side." Optical waveguide channels 230 are diffused into the surface of the process side of the substrate 110 to a desired depth. Each of the optical waveguide channels 230 extends from an input branch 231 to an output branch 232. Electrode connection pads 112, 114 and 116 are formed of metal deposited onto the surface of the process side of the substrate 110. Typically, this metal is either gold or copper and is formed by vapor deposition or electroplating to a desired height on the top of the substrate 110.

As can be seen from FIG. 1, the electrode connection pads 112, 114 and 116 are coplanar, residing on the planar surface of the substrate 110. Center electrode connection pad 114 is between two outer electrode connection pads 112 and 116. Electrode connection pad 114 is referred to as the "hot" electrode connection pad, while electrode connection pads 112 and 116 are the "ground" electrode connection pads.

The coaxial cable 170 has a center conductor 172 which is concentric with an outer conductor 174. Outer conductor 174 serves to shield the signal at the center conductor 172 from external electromagnetic interference. Coaxial cable 170 supplies a microwave signal through connections 176 to the impedance matching circuit 150. Impedance matching circuit 150 serves to compensate for the difference in output impedance of the microwave signal modulation source 171 and coaxial cable 170, which is typically 50 ohms, to the input impedance of the traveling wave optical modulator 100, which is typically less than 50 ohms. Impedance matching is desired since an impedance mismatch would cause reflections at the interface of the coaxial cable 170 and the optical modulator 110. Such reflections cause electrical power loss and perturbations in the microwave signal. If the optical modulator impedance is substantially equal to 50 ohms, an impedance matching circuit 150 may not be needed.

The impedance matching circuit 150 interconnects the microwave signal from the coaxial cable 170 to the optical modulator 100 at the launch end 130 of the modulator. At the launch end 130 of the optical modulator 100, electrode connection pads 112, 114 and 116 are of sufficient size such that a mechanical connection can be made. In the conventional device shown in FIG. 1, note that the center conductor 172 of the coaxial cable 170 is electrically connected to the hot electrode connection pad 114 of the optical modulator 100. Also note that the outer conductor 174 of the coaxial cable 170 is connected to the ground electrode connection pads 112 and 116 of the optical modulator 100.

In conventional devices, the ground electrodes have traditionally been used for shielding purposes and have therefore been maintained as large as possible in order to provide greater protective shielding from undesired electromagnetic effects. Also, in conventional devices, the ground electrodes or ground planes have been made as large as possible in order to provide more efficient current dissipation to reduce resistive losses. In typical optical modulators, ground electrodes 120 and 124 have been ten or more times as wide as hot electrode 122. This width ratio refers to the width of the electrodes in an interactive length region, L, of the optical modulator 100. The interactive length region is discussed below.

At the launch end 130 of the optical modulator 100, the primary objective is to make the electrode connection pads 112, 114 and 116 large enough to allow good mechanical contact with the impedance matching circuit 150 and to maintain an impedance match between the launch end and the region of interactive length, L, on the modulator. In the region of the launch end 130, the hot electrode connection pad 114 is separated from the ground electrode connection pads 112 and 116 by gaps 118. As both gaps 118 are preferably equal, when a gap width is referred to, it is understood to mean the width of either one of the gaps. The hot electrode 114 is tapered, and the gap width 118 is narrowed to maintain a constant ratio of gap to hot electrode width. The tapering continues until the hot electrode is reduced to its desired width at point 119 which is at one end of the interactive length region, L.

Point 129 is the other end of the interactive length region, L. Within the interactive length region, L, the optical waveguide channels 230 underlie gaps 126 where the electromagnetic effect of the electrodes 120, 122 and 124 on the optical index of refraction of the waveguides is strong. From FIG. 1 it can be seen that the ground electrodes 120 and 124 and hot electrode 122 are of constant widths within the interactive region, L. Also, within interactive region, L, the width of gaps 126 is constant so the gap-to-hot-electrode-width is a constant ratio. Along this length of constant gap-to-hot-electrode-width ratio the electric field created by the microwave signal propagating along the lengths of the electrodes 120, 122 and 124 overlaps with the optical waveguide channels 230 within the substrate 110 to modulate the index of refraction of the waveguides.

The direction of propagation of the microwave signal along t he electrodes 120, 122 and 124 in the region of interactive length, L, is shown in FIG. 1 by arrow 192. Since the microwave signal is a propagating wave defined by the voltage differentials between the hot electrode and either of the ground electrodes, the direction of the microwave signal is constant in the direction indicated by arrow 192.

When the microwave signal is applied, currents are generated in electrodes 120, 122 and 124. These currents are also essentially in a direction along the length of the electrodes. However, the current in the hot electrode is in an opposite direction to the direction of currents in the ground electrodes at any given point in time.

Arrows 190 and 194 show the direction of currents along the ground electrodes 120 and 124, respectively, at the same point in time as the propagation of the current designated by arrow 192 in the hot electrode 122. At this point in time, the current along the hot electrode is in the same direction as the direction of propagation of the microwave signal. Since the current is sinusoidal, the directions of current in the hot and ground electrodes will continually "switch" directions, with the current in the hot electrode always maintaining an opposite direction to the direction of current in either of the ground electrodes.

The optical waveguide channels 230 are located beneath the surface of the substrate 110. In one form of the prior art optical modulator 100 there are two optical waveguide channels 230, one directly below each gap 126 and running parallel to the hot electrode 122 within the interactive region, L. The optical waveguide channels 230 are not beneath the electrode connection pads 112, 114 and 116 at either the launch or termination ends, and there is no appreciable effect on the optical index of refraction of the waveguides from the electrode connection pads at these launch and termination ends.

In FIG. 1, the termination end 132 of the optical modulator 100 is shown. At the termination end 132, the same types of impedance matching problems that exist at the launch end 130 are encountered. Therefore, the electrodes at the termination end 132 have been enlarged similarly to the electrodes at the launch end in order to provide sufficient areas for mechanical connections to take place. Termination resistors 180 serve to match the impedance of the optical modulator 100 at the termination end 132. Resistors 180 may be located on the substrate 110 or external to the substrate. If resistors 180 are on the substrate 110, impedance matching circuit 150 will not be used at the termination end. If resistors 180 are off the substrate 110, a coaxial cable can be used to connect the resistors to the electrode connection pads 112, 114 and 116 at the termination end 132. In this case, the matching circuit 150 will be needed to match the impedance of the optical modulator 100 to the impedance of the coaxial cable.

In operation, as a microwave signal is typically applied to electrodes 120, 122 and 124, the optical index of refraction of the optical waveguide channels 230 is affected. Consequently, the effective optical path lengths of the optical waveguide channels 230 differ as a result of the difference in electric field passing through the waveguides.

Optical energy which enters through the input branch 231 splits so that the intensity of light traversing in each optical waveguide channel is half of the light in the input branch. The different optical path lengths cause the light in one optical waveguide channel 230 to be out of phase with the light in the second. The light from both optical waveguide channels 230, being out-of-phase, combines at the output branch 232 and thereby modulates the intensity of the light.

Figure 2:
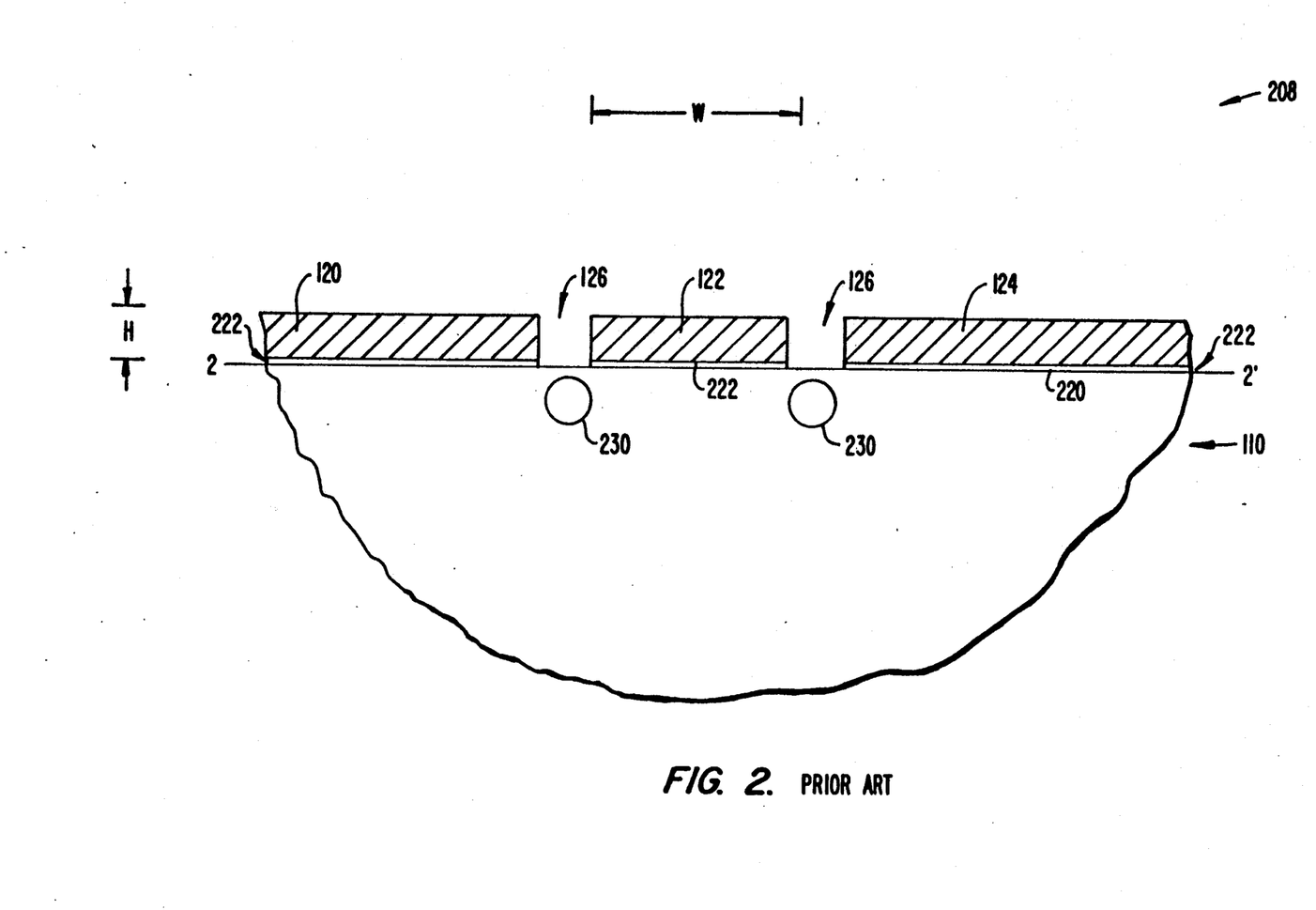
FIG. 2 is a cross-sectional view taken along line 2—2' of the prior art device of FIG. 1, illustrating the critical dimensions of the optical modulator.

FIG. 2 is a cross-sectional view along the line 2—2' of FIG. 1. Electrodes 120, 122 and 124, and gaps 126, correspond to the identically numbered elements of FIG. 1. FIG. 2 is approximately to scale. The electrodes 120, 122 and 124 are positioned above the lithium niobate substrate 110. The electrodes are separated from the lithium niobate substrate by buffer layer 222. Typically, this buffer layer is silicon dioxide ($SiO_2$). Above and around the electrodes, most notably within the gaps 126, will be air 208. The optical waveguide channels 230 are shown in cross-section located beneath the gaps 126 and below the surface 220 of substrate 110.

The electrodes 120, 122 and 124 have a width in the horizontal dimension of the figure. The vertical dimension of the electrodes 120, 122 and 124 is the height or thickness of the electrodes. The vertical dimension of the buffer layer 222 is the thickness of the buffer layer. In the prior art, the width of the hot electrode 122 is on the order of tens of microns, typically 24 microns. The width of the ground electrodes 120 and 124 is on the order of ten times the width of the hot electrode. The thickness of the electrodes 120, 122 and 124 is on the order of a few microns, typically 3 microns. The thickness of the buffer layer 222 is on the order of tenths of microns, typically 0.2 microns. The width of gaps 126 is on the order of microns, typically 6 microns. The optical waveguide channels 230 are non-circular and have a major axis width of 5 microns.

DESCRIPTION OF A PREFERRED EMBODIMENT

Figure 3:
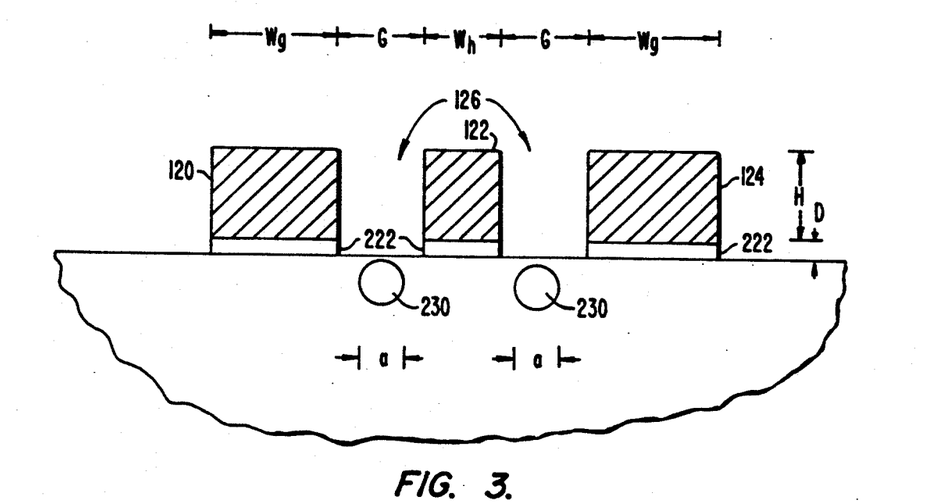
FIG. 3 is a cross-sectional view of the present invention similar to the cross-sectional view of the prior art device of FIG. 2, showing the relative changes in the critical dimensions.

The present invention has an overall structure similar to the structure of the prior art optical modulator 100 as illustrated in FIG. 1. The present invention differs in the sizes and placement of the electrodes 120, 122 and 124 as illustrated by a cross section analogous to the cross section along line 2—2' of FIG. 1 shown in FIG. 2. FIG. 3 is a cross-sectional view of the optical modulator arranged in a manner similar to that of FIG. 2 to illustrate an embodiment of the present invention.

FIG. 3 is roughly drawn to the same scale as FIG. 2 to show the structural changes in the preferred embodiment of the present invention from the prior art. In FIG. 3, $W_g$ is the width of the ground electrodes 120 and 124, G is the width of the gaps 126, $W_h$ is the width of the hot electrode 122, H is the height of the electrodes and D is the thickness, or depth, of the buffer layer 222. In the present invention, the ground electrode width $W_g$ has been made on the order of the hot electrode width $W_h$. The buffer layer thickness D has been increased, and the electrode thickness H has been increased. As a result of these changes, the gap width G has been made larger than the gap width of the conventional optical modulator shown in FIG. 2, and the hot electrode width $W_h$ has been narrowed. For the reasons discussed below, these structural changes result in a greatly improved traveling wave optical modulator.

Figure 4:
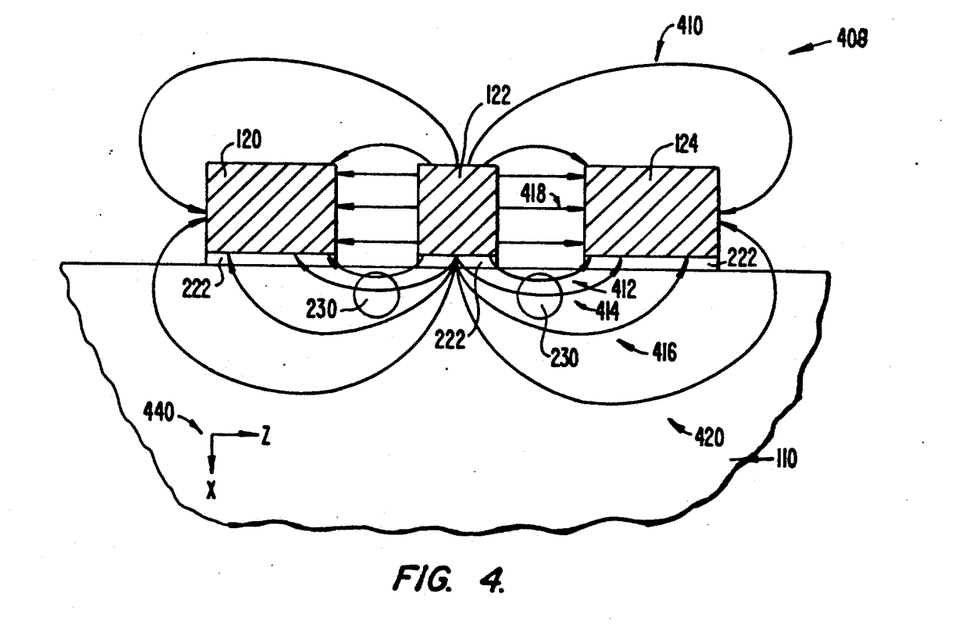
FIG. 4 is a cross-sectional view of the present invention similar to FIG. 3, including an illustration of the electric field lines caused by a microwave signal propagating along the electrodes.

FIG. 4 is a cross-sectional view of the optical modulator similar to FIG. 3. Additionally, FIG. 4 shows the electric field lines generated by a microwave signal traveling along the length of the electrodes 120, 122 and 124. The electric field lines are shown as lines with arrows to indicate their emanation from the hot electrode 122 to either of the ground electrodes 120 or 124. While the electric field lines are shown as discrete lines, it is understood that they comprise a continuous electric field extending to infinity. Note that the greatest intensity of the electric field occurs near the edges of the electrodes 120, 122 and 124, the areas of so-called "fringing" fields.

As can be seen from FIG. 4, electric field line 410 originates at hot electrode 122 and passes through the air 408 to terminate at ground electrode 124. Similarly, electric field line 418 passes through the air 408 between electrodes 122 and 124. Electric field line 420 originates at hot electrode 122, passes through the buffer layer 222, then passes through the substrate 110, then through the air 408 to terminate at ground electrode 124. Electric field line 414 passes through the buffer layer 222, the substrate 110, the optical waveguide channel 230, the substrate once again, and, finally, the buffer layer underlying ground electrode 124. Electric field line 412 passes through the buffer layer 222, the air 408, substrate 110, optical waveguide channel 230, substrate, air, and buffer layer, before terminating at ground electrode 124.

The material or materials that the electric field lines pass through are significant since each material has a different dielectric constant, and the dielectric constant of the material, along with the length of the path of the electric field through the material and the concentration of electric field lines within the material, determine the velocity of the microwave signals along the electrodes 120, 122 and 124. That is, the higher the concentration of electric field lines passing through materials of lower dielectric constant, the faster will be the microwave current propagation along the electrodes 120, 122 and 124.

A discussion of dielectric constants is analogous to speaking of indices of refraction because an index of refraction of a medium is the square root of the dielectric constant of that medium. An "effective" dielectric constant for a microwave signal in an optical modulator incorporates each of the individual dielectric constants of the media which affect the propagation of the microwave signal. Similarly, an effective dielectric constant for an optical signal incorporates each of the dielectric constants of the media which affect the propagation of the optical signal.

In view of this, velocity matching may be spoken of as the matching of the effective optical index of refraction with the effective microwave index of refraction or as the matching of the effective microwave dielectric constant with the effective optical dielectric constant. It should be recalled from the discussion in the Background of the Invention section that velocity matching of the microwave signal to the optical signal is a critical design goal.

The optical signal is faster than the microwave signal due to the relatively large dielectric constant of the substrate 110. Since it is desired to speed up the velocity of the microwave signal, it is desired that the material through which the electric field passes be of low dielectric constant. In FIG. 4, both the air 408 and the buffer layer 222 have a lower dielectric constant than the substrate 110 and the optical waveguide channels 230. The effective dielectric constant of the optical modulator 100 would be a function of the different materials that the electric field passes through, along with the length of the path that the electric field follows through the material. Such an effective dielectric constant reflects the overall dielectric constant of the optical modulator 100 and is an indicator of the velocity of the microwave signal.

In accordance with the invention, by increasing the height H of the electrodes 120, 122 and 124, more of the electric field which is produced passes through the air 408. Also, increasing the thickness of the buffer layer 222 means that more of the electric field, particularly the high concentration of the electric field at the edges of the electrodes 120, 122 and 124, passes through the buffer layer 222. Both increasing the height of the electrodes 120, 122 and 124 and increasing the thickness of the buffer layer 222 act to decrease the overall effective dielectric constant of the optical modulator 100. While increasing the thickness of the buffer layer 222 also somewhat decreases the concentration of electric field passing through the optical waveguide channels 230, it has been found in accordance with the invention that the beneficial effects of velocity matching outweigh the detrimental effect of a lower intensity of electric field overlapping the optical waveguide channels.

Increasing the electrode thickness H, however, has the adverse effect of decreasing the impedance of the optical modulator 100. The impedance of the optical modulator 100 is typically already below that desired to begin with, so further decreasing the impedance by increasing the electrode height H is not desired. However, in accordance with the invention, increasing the buffer layer thickness D compensates for this by increasing the impedance of the optical modulator 100 while at the same time also decreasing the effective dielectric constant to provide velocity matching. The limit to increasing the buffer layer thickness D, though, is that drive voltage will have to be increased to achieve the same effects on the optical refractive index of the optical waveguide channels 230. The drive voltage is desired to be kept low to keep the drive power requirements low. Increasing the electrode height H also decreases the microwave loss by providing improved electrical conductivity for the microwave signal along the electrodes.

Optimizing the optical modulator design by manipulating the parameters of electrode height H and buffer layer thickness D results in a design with improved velocity matching, an acceptable bias voltage requirement, and an impedance of approximately 40 ohms, about 10 ohms under the ideal impedance of 50 ohms. However, in accordance with the invention by also decreasing the ground electrode width $W_g$, the impedance can be increased without adversely affecting the velocity matching or drive voltage requirement of the optical modulator 100.

By decreasing the ground electrode width $W_g$ to the order of the hot electrode width $W_h$, improved impedance matching can be achieved with velocity matching which is greatly improved over the prior art. It has been determined by computer simulation that decreasing the width of the ground electrodes 120 and 124 to approximately two times the width of the hot electrode 122 produces a substantial increase in velocity matching without degrading impedance. The beneficial effects of decreasing the ground electrode width $W_g$ begin to appear when the ground electrode width $W_g$ has been decreased to about 3 times the hot electrode width $W_h$.

The limit to the ground electrode width $W_g$, calculated by computer simulation, is approximately that of the hot electrode width $W_h$ or the gap width G, whichever is smaller, since at these widths, the decrease in ground electrode width begins to have a large effect on decreasing the amount of electric field overlapping the optical waveguide channels 230. Alternatively, this effect can be defined in terms of the gap width G. That is, a beneficial effect on impedance matching is also seen when the ground electrode width $W_g$ is decreased to about 3 times the gap width G.

In summary, the height H of the electrodes 120, 122 and 124 is increased to on the order of 10 to 15 microns as compared to typically 3 microns in the prior art. Also, the thickness D of the buffer layer 222 is increased to on the order of 1.0 to 1.5 microns as compared to typically 0.2 microns in the prior art. Furthermore, the ground electrode width $W_g$ is reduced from several hundred microns in the prior art to 15 to 25 microns, and the hot electrode width $W_h$ is reduced from typically 24 microns to 7 to 13 microns, such that the ratio $W_g$ to $W_h$ is less than or about equal to 3. The gap width G can be wider, but is on the order of the reduced hot electrode width $W_h$. Consequently, the thicknesses, dielectric constants and locations of the electrodes 120, 122 and 124 are such that the effective microwave index of refraction is within 35% of the optical index of refraction as compared to approximately 65% in the prior art.

The substrate for a traveling wave optical modulator can consist of various materials, the only requirement being that the material have an optical index of refraction which is changeable in response to an applied modulation signal. For example, lithium niobate, lithium tantalate and gallium arsenide have all been used as substrates for optical modulators. Of these, lithium niobate is the most popular material, in part because of the following properties: (1) its transparency in the visible and near-infrared regions of the optical spectrum, (2) large single-domain crystals of optical quality can be easily grown, (3) the electro-optic figure of merit is among the largest of known materials, and (4) optical waveguide channels are relatively easily fabricated using standard processing techniques. The preferred embodiment of the present invention is implemented in X-cut lithium niobate as discussed below.

Lithium niobate is an anisotropic crystal in that it has different indices of refraction for different lattice directions of the crystal structure. It is convenient to speak of the lithium niobate crystal structure as having three directions, that is X, Y and Z, corresponding to the three-dimensional cartesian axes. The Z direction of the crystal is defined to be the direction in which an electric field of a given intensity causes the greatest effect on changing the optical index of refraction of the crystal substrate.

In FIG. 4, axes 440 are shown. As can be seen, the X direction is vertical, the Z direction is horizontal, and the Y direction is directly into and out of the plane of the figure.

This orientation is known as an X-cut crystal in that the Z direction is parallel to the upper surface of the substrate 110 and the X direction is perpendicular to it. In an X-cut crystal, therefore, the greatest effect on changing the optical index of refraction will result from the horizontal component of the electric field lines. This is why optical waveguide channels 230 are located between the electrodes 120, 122 and 124. As can be seen, electric field lines such as 412 and 414 overlap the optical waveguide channel 230 where the electric field lines are essentially horizontal.

In a second type of lithium niobate crystal cut, the so-called Z-cut, the X and Z directions are switched so that the X direction would be horizontal to the upper surface of the substrate 110, while the Z direction would be perpendicular to it. This would mean that the vertical component of the electric field lines would be exerting the greatest influence on changing the optical index of refraction of the optical waveguide channels 230. Hence, in a Z-cut optical modulator (not shown), the optical waveguide channels would be located directly under the electrodes in order to overlap with the vertical component of the electric field lines.

X-cut devices are less susceptible to problems associated with acoustic resonances and with microwave modes which are experienced in Z-cut devices. Another advantage of an X-cut device is that the pyroelectric effect is less pronounced. The pyroelectric effect causes charge to build up due to temperature changes. This is an adverse effect both during fabrication and during operation of an optical modulator.

One embodiment of the invention uses a thick buffer layer 222 and thick electrodes 120, 122 and 124 on X-cut lithium niobate. This results in the most efficient high frequency design known to date. The impedance of this optical modulator is approximately 40 ohms. As is typical of conventional optical modulators, this is below the goal of a 50 ohm impedance. Nevertheless, the slightly less than ideal impedance does not significantly compromise the performance.

As indicated above, however, the present invention provides a means of achieving improved impedance matching. Impedance matching to 50 ohms has not been achieved in the prior art where designs also include achieving good velocity matching and obtaining a low drive voltage. This is because the goal of impedance matching to 50 ohms has always been a tradeoff between these other important goals.

For example, making the gaps 126 wider will increase the impedance, but this also increases the drive voltage requirements. Making the buffer layer 222 thicker by increasing D will increase the impedance, but this also increases the drive voltage. Shortening the electrode height, H, will increase impedance at the expense of raising the effective dielectric constant, which impairs velocity matching. Making the hot electrode 122 narrower by decreasing $W_h$ will increase the impedance but also causes more RF losses in the microwave signal.

Alternatively, where close impedance matching has not been achieved, an impedance matching circuit 150 can be used. But this is not desirable because it provides poor impedance matching at low frequencies or has resistive losses.

In accordance with the present invention, it has been found that narrowing the ground electrodes 120 and 124 by decreasing $W_g$ will increase the impedance without adverse effects on any of the other critical parameters as long as $W_g$ does not become smaller than the gap width, G, or the hot electrode width, $W_h$. Computer simulation demonstrates that the beneficial effect of raising impedance without adversely affecting the overlap integral begins at a $W_g$ of about 3 times $W_h$. The overlap integral is a measure of the magnitude of the overlap of the electric field with the optical channels.

By decreasing the width of the ground electrodes 120 and 124 in an optical modulator with thick electrodes and thick buffer layer on X-cut lithium niobate, it is projected that an efficient modulator with improved impedance matching can be realized.

The described Mach-Zehnder optical modulator is designed to provide minimum velocity mismatch between the optical signal and applied microwave signal to achieve broad band intensity modulation. The same broad band frequency response can be obtained in alternative optical device structures. One of the optical waveguide channels 230 can be eliminated in order to provide a phase modulator. Alternatively, the optical waveguide channels 230 can be closely spaced (i.e., within less than 10 microns of each other) to produce an optical directional coupler modulator.

It is to be understood that while the invention has been described above in conjunction with a preferred specific embodiment, the description and examples are intended to illustrate and not limit the scope of the invention, which is defined by the appended claims.

What is claimed is:

1. An optical modulator apparatus for modifying an optical signal in response to an electromagnetic signal, said apparatus comprising:

a substrate having a process side and a first optical index of refraction;

at least one optical waveguide connected to said substrate wherein said waveguide has a second optical index of refraction, said waveguide being surrounded by at least one medium whose index of refraction is less than the second index of refraction such that said waveguide provides a channel for transmission of optical energy by total internal reflection;

a plurality of elongated electrodes connected to said substrate so that the electrodes are adjacent to one another and proximate to said at least one optical waveguide;

means for applying a voltage differential across at least a pair of said plurality of electrodes to produce a traveling wave propagating along said electrode pair in a predetermined direction thereby generating an electric field which overlaps with said at least one optical waveguide causing a change in the optical index of refraction of the overlapped waveguide in response to the applied voltage differential, said change in the optical index of refraction modulating an optical signal in the overlapped waveguide as a function of the electric field;

wherein electrode width with respect to a given electrode in the pair is defined as an average dimension of said given electrode along a direction perpendicular to the predetermined direction of propagation of said traveling wave within said electrode and parallel to the process side of the substrate; and wherein one electrode of the pair is wider than the other in the pair and the ratio of the width of the wider electrode to that of the narrower electrode in the pair does not exceed about 3.

2. The apparatus of claim 1, wherein the wider electrode in the pair is connected to electrical ground.

3. The apparatus of claim further comprising means for conducting microwave signals from a source of said microwave signals to said electrodes, wherein said conducting means comprises shielding means to reduce the effect of external electromagnetic interference upon said microwave signals, and wherein the wider electrode in the pair is electrically connected to said shielding means.

4. The apparatus of claim 1, wherein said at least one optical waveguide comprises a channel of diffused material within said substrate.

5. The apparatus of claim 1, wherein said substrate is one of an X-cut lithium niobate and an X-cut lithium tantalate crystal.

6. The apparatus of claim 1, wherein said substrate is one of a Z-cut lithium niobate and a Z-cut lithium tantalate crystal.

7. The apparatus of claim 1, further comprising:
a buffer layer between said electrodes and said substrate, said buffer layer having a first surface and a second surface, said buffer layer having a microwave index of refraction less than that of the substrate, said buffer layer having a thickness defined as the average distance between the first and second surfaces, wherein said second surface is closer to said substrate than said first surface, wherein said buffer layer is positioned such that the electric field generated by said electrodes passes through said buffer layer;

said electrodes each having a first surface and a second surface, the thickness of each electrode defined as the distance between the two surfaces of said electrode wherein the second surface is closer to said substrate and the first surface is farther from said substrate;

a medium within said gap, said medium having a microwave index of refraction less than that of said substrate, said electrode thickness thereby determining the amount of electric field generated by said voltage differential across said medium within said gap; and wherein the thicknesses, dielectric constants and locations of the electrodes and buffer layer are such that the effective microwave index of refraction is within 35% of the optical index of refraction.

8. The apparatus of claim 7, wherein the wider electrode in the pair is connected to electrical ground.

9. The apparatus of claim 7, further comprising means for conducting microwave signals from a source of said microwave signals to said electrodes, wherein said conducting means comprises shielding means to reduce the effect of external electromagnetic interference upon said microwave signals, and wherein the wider electrode in the pair is electrically connected to said shielding means.

10. The apparatus of claim 7, wherein said at least one optical waveguide comprises a channel of diffused material within said substrate.

11. An optical modulator apparatus for modifying an optical signal in response to an electromagnetic signal, said apparatus comprising:
a substrate having a process side and a first optical index of refraction;

at least one optical waveguide connected to said substrate wherein said waveguide has a second optical index of refraction, said waveguide being surrounded by at least one medium whose index of refraction is less than the second index of refraction, such that said waveguide provides a channel for transmission of optical energy by total internal reflection;

a plurality of elongated electrodes connected to said substrate so that the electrodes are adjacent to one another and proximate to said at least one optical waveguide;

means for applying a voltage differential across at least a pair of said plurality of electrodes to produce a traveling wave propagating along said electrode pair in a predetermined direction thereby generating an electric field which overlaps with said at least one optical waveguide causing a change in the optical index of refraction of the overlapped waveguide in response to the applied voltage differential, said change in the optical index of refraction modulating an optical signal in the overlapped waveguide as a function of the electric field;

wherein electrode width with respect to a given electrode in the pair is defined as an average dimension of said given electrode along a direction perpendicular to the predetermined direction of propagation of said traveling wave within said electrode and parallel to the process side of the substrate;

wherein gap width with respect to an electrode pair is defined as the average separation of the electrodes of said electrode pair; and wherein one electrode of the pair is wider than the other in the pair and the ratio of the width of the wider electrode of the pair to the gap width does not exceed about 3.

12. The apparatus of claim 11, wherein the wider electrode in the pair is connected to electrical ground.

13. The apparatus of claim further comprising means for conducting microwave signals from a source of said microwave signals to said electrodes, wherein said conducting means comprises shielding means to reduce the effect of external electromagnetic interference upon said microwave signals, and wherein the wider electrode in the pair is electrically connected to said shielding means.

14. The apparatus of claim 11, wherein at least one optical waveguide comprises a channel of diffused material within said substrate.

15. The apparatus of claim 11, wherein said substrate is one of an X-cut lithium niobate and an X-cut lithium tantalate crystal.

16. The apparatus of claim 11, where said substrate is one of a Z-cut lithium niobate and a Z-cut lithium tantalate crystal.

17. The apparatus of claim 11, further comprising:
a buffer layer between said electrodes and said substrate, said buffer layer having a first surface and a second surface, said buffer layer having a microwave index of refraction less than that of the substrate, said buffer layer having a thickness defined as the average distance between the first and second surfaces, wherein said second surface is closer to said substrate than said first surface, wherein said buffer layer is positioned such that the electric field generated by said electrodes passes through said buffer layer;
said electrodes each having a first surface and a second surface, the thickness of each electrode defined as the distance between the two surfaces of said electrode wherein the second surface is closer to said substrate and the first surface is farther from said substrate;
a medium within said gap, said medium having a microwave index of refraction less than that of said substrate, said electrode thickness thereby determining the amount of electric field generated by said voltage differential across said medium within said gap; and
wherein the thicknesses, dielectric constants and locations of the electrodes and buffer layer are such that the effective microwave index of refraction is within 35% of the optical index of refraction.

18. The apparatus of claim 17, wherein the wider electrode in the pair is connected to electrical ground.

19. The apparatus of claim 17, further comprising means for conducting microwave signals from a source of said microwave signals to said electrodes, wherein said conducting means comprises shielding means to reduce the effect of external electromagnetic interference upon said microwave signals, and wherein the wider electrode in the pair is electrically connected to said shielding means.

20. An optical modulator apparatus for modifying an optical signal in response to an electromagnetic signal, said apparatus comprising:
a substrate comprising one of an X-cut lithium niobate and an X-cut lithium tantalate crystal having a process side and a first optical index of refraction;
at least one optical waveguide connected to said substrate wherein said waveguide has a second optical index of refraction, said waveguide being surrounded by at least one medium whose index of refraction is less than the second index of refraction, such that said waveguide provides a channel for transmission of optical energy by total internal reflection;
a plurality of elongated electrodes connected to said substrate so that the electrodes are adjacent to one another and proximate to said at least one optical waveguide;
means for applying a voltage differential across at least a pair of said plurality of electrodes to produce a traveling wave propagating along said electrode pair thereby generating an electric field which overlaps with said at least one optical waveguide causing a change in the optical index of refraction of the overlapped waveguide in response to the applied voltage differential, said change in the optical index of refraction modulating an optical signal in the overlapped waveguide as a function of the electric field;
a buffer layer between said electrodes and said substrate, said buffer layer having a first surface and a second surface, said buffer layer having a microwave index of refraction less than that of the substrate, said buffer layer having a thickness defined as the average distance between the first and second surfaces, wherein said second surface is closer to said substrate than said first surface, and wherein said buffer layer is positioned such that the electric field generated by said electrodes passes through said buffer layer;
said electrodes each having a first surface and a second surface, the thickness of each electrode defined as the distance between the two surfaces of said electrode wherein the second surface is closer to said substrate and the first surface is farthest from said substrate;
a medium between the electrodes of an electrode pair, said medium having a microwave index of refraction less than that of said substrate, said electrode thickness thereby determining the amount of electric field generated by said voltage differential across said medium; and
wherein the thicknesses, dielectric constants and locations of the electrodes and buffer layer are such that the effective microwave index of refraction is within 35% of the optical index of refraction.

* * * * *